United States Patent
Glatt

(10) Patent No.: US 11,010,760 B2
(45) Date of Patent: May 18, 2021

(54) EMBEDDED ELECTRONIC PAYMENT SYSTEM AND INTEGRATED CIRCUIT

(71) Applicant: Electronic Payments, Inc., Calverton, NY (US)

(72) Inventor: Terry L Glatt, Pompano Beach, FL (US)

(73) Assignee: Electronic Payments Inc., Calverton, NY (US)

( * ) Notice: Subject to any disclaimer, the term of this patent is extended or adjusted under 35 U.S.C. 154(b) by 486 days.

(21) Appl. No.: 15/469,208

(22) Filed: Mar. 24, 2017

(65) Prior Publication Data
US 2017/0243210 A1    Aug. 24, 2017

Related U.S. Application Data

(63) Continuation of application No. 13/937,199, filed on Jul. 8, 2013, now abandoned.
(Continued)

(51) Int. Cl.
*G06Q 20/40* (2012.01)
*G06Q 20/34* (2012.01)
(Continued)

(52) U.S. Cl.
CPC ............. *G06Q 20/40* (2013.01); *G06Q 20/18* (2013.01); *G06Q 20/30* (2013.01); *G06Q 20/341* (2013.01);
(Continued)

(58) Field of Classification Search
CPC ........ G06Q 20/40; G06Q 20/18; G06Q 20/30; G06Q 20/341; G06Q 20/353;
(Continued)

(56) References Cited

U.S. PATENT DOCUMENTS

| | | | |
|---|---|---|---|
| 5,892,900 A * | 4/1999 | Ginter | G06Q 20/12 726/26 |
| 7,110,986 B1 * | 9/2006 | Zajkowski | G06Q 20/108 705/42 |

(Continued)

FOREIGN PATENT DOCUMENTS

EP        2061001 A1 *   5/2009    ............. G06Q 20/18

OTHER PUBLICATIONS

Murphy, Refrigerator Magnet Lets You Order a Pizza in One Tap, retrieved from https://mashable.com/2012/03/26/magnet-pizza, Mar. 26, 2012, 2 pages (Year: 2012).*

*Primary Examiner* — James D Nigh
(74) *Attorney, Agent, or Firm* — Ingram IP Law, P.A.

(57) ABSTRACT

An embedded electronic payment (EEP) system allows various devices and appliances to act as a merchant to accept electronic payments. The EEP system can be formed on an integrated circuit or as a software applet to run on a virtual machine. The integrated chip can be a standard IC, an application specific integrated chip, programmable logic device, or a multiprocessor based microcontroller. The EEP system operates with a standard interface that can be adapted to many applications. As a result, the cost of payment integration is reduced. The reduced cost of inclusion allows electronic payment systems to be applied in systems and devices where cost margins previously prohibited custom electronic payment systems. When the EEP system is included as an integrated chip, the system has improved security and power consumption compared to software solutions.

20 Claims, 4 Drawing Sheets

Related U.S. Application Data

(60) Provisional application No. 61/668,960, filed on Jul. 6, 2012.

(51) Int. Cl.
  *G07F 7/08* (2006.01)
  *G06Q 20/30* (2012.01)
  *G06Q 20/18* (2012.01)
  *G06Q 20/38* (2012.01)

(52) U.S. Cl.
  CPC ....... *G06Q 20/353* (2013.01); *G06Q 20/3563* (2013.01); *G06Q 20/3829* (2013.01); *G06Q 20/40975* (2013.01); *G07F 7/088* (2013.01); *G07F 7/0873* (2013.01)

(58) Field of Classification Search
  CPC ........... G06Q 20/3563; G06Q 20/3829; G06Q 20/40975; G07F 7/0878; G07F 7/088
  USPC .......................................................... 705/65
  See application file for complete search history.

(56) References Cited

U.S. PATENT DOCUMENTS

| | | | | |
|---|---|---|---|---|
| 7,551,098 | B1* | 6/2009 | Chock | G08B 29/08 174/50 |
| 8,600,899 | B1* | 12/2013 | Davis | G06Q 20/18 705/75 |
| 8,676,249 | B2* | 3/2014 | Rosenberg | B60B 33/0039 455/550.1 |
| 8,856,045 | B1* | 10/2014 | Patel | G07F 9/001 705/71 |
| 9,558,489 | B2* | 1/2017 | Hoffman | G06Q 20/04 |
| 2005/0210289 | A1* | 9/2005 | Brown | H04L 63/0442 726/5 |
| 2007/0241182 | A1* | 10/2007 | Buer | G06Q 20/40975 235/380 |
| 2008/0126797 | A1* | 5/2008 | Kim | H04L 9/3263 713/155 |
| 2008/0227391 | A1* | 9/2008 | Rosenberg | B62B 9/00 455/41.1 |
| 2009/0132813 | A1* | 5/2009 | Schibuk | G06Q 20/322 713/158 |

\* cited by examiner

EMBEDDED ELECTRONIC PAYMENT SYSTEM AND INTEGRATED CIRCUIT

CROSS-REFERENCE TO RELATED APPLICATIONS

This application is a continuation of U.S. application Ser. No. 13/937,199 filed Jul. 8, 2013 and claims the benefit of U.S. Provisional Application No. 61/668,960, filed Jul. 6, 2012, which are hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to devices and systems including and utilizing Embedded Electronic Payment (EEP) systems.

2. Description of the Related Art

Credit cards as a form of electronic payment processing traditionally involves the following transaction functions associated with a merchant account implementation which heretofore is implemented in software.

Authorization: The cardholder presents the card as payment to the merchant and the merchant submits the transaction to the acquirer (acquiring bank). The acquirer verifies the credit card number, the transaction type and the amount with the issuer (Card-issuing bank) and reserves that amount of the cardholder's credit limit for the merchant. An authorization will generate an approval code, which the merchant stores with the transaction.

Batching: Authorized transactions are stored in "batches", which are sent to the acquirer. Batches are typically submitted once per day at the end of the business day. If a transaction is not submitted in the batch, the authorization will stay valid for a period determined by the issuer, after which the held amount will be returned to the cardholder's available credit (see authorization hold). Some transactions may be submitted in the batch without prior authorizations; these are either transactions falling under the merchant's floor limit or ones where the authorization was unsuccessful but the merchant still attempts to force the transaction through. (Such may be the case when the cardholder is not present but owes the merchant additional money, such as extending a hotel stay or car rental.)

Clearing and Settlement: The acquirer sends the batch transactions through the credit card association, which debits the issuers for payment and credits the acquirer. Essentially, the issuer pays the acquirer for the transaction.

Funding: Once the acquirer has been paid, the acquirer pays the merchant. The merchant receives the amount totaling the funds in the batch minus either the "discount rate," "mid-qualified rate", or "non-qualified rate" which are tiers of fees the merchant pays the acquirer for processing the transactions.

Chargebacks: A chargeback is an event in which money in a merchant account is held due to a dispute relating to the transaction. Chargebacks are typically initiated by the cardholder. In the event of a chargeback, the issuer returns the transaction to the acquirer for resolution. The acquirer then forwards the chargeback to the merchant, who must either accept the chargeback or contest it.

An acquiring bank (or acquirer) is the bank or financial institution that processes credit and or debit card payments for products or services for a merchant. The term acquirer indicates that the bank accepts or acquires credit card payment from the card-issuing banks within an association.

For a software or developer to create software and hardware applications to work with a particular acquirer, the acquirer will require that the application be reviewed and certified before the application can be distributed.

Development of a particular electronic payment system requires significant labor, cost, development time, and certification time. Furthermore, a given electronic payment system is difficult to apply to situations other than the originally-intended application (i.e., inflexible). Different credit card transaction acquirers set different requirements with which a particular electronic payment system may not be compatible. A particular payment system will provide a particular security level that may not be acceptable in other applications. Upgrading a particular electronic payment system may be costly and/or impossible.

Development effort is steep for implementing a payment processing, or merchant account interface. There are number of acquirers: e.g., TSYS, Global Payments, First Data, Paymentech, and Heartland, etc. Each acquirer has its own unique protocol that must be implemented through software code and compiled for a particular platform, e.g., Windows or Android. Acquirers exist for various electronic payment systems, not just credit cards.

In software electronic payment systems, discrete software development efforts are needed for each implementation. Then, each acquirer requires certification and security assessments.

High development costs of software electronic payment systems prevent the inclusion of such solutions as commodities into appliances, computers, phones, etc.

Certification. Each acquirer requires its own certification of a particular electronic payment system. Examples of acquirers requiring specific certifications are TSYS, Global Payments, First Data, Paymentech, and Heartland.

The costs of development prevent the inclusion of electronic payment systems on particular devices that otherwise might be used to receive payments.

Security is a big concern surrounding electronic payments. Software payment applications and utilizing devices are largely implemented on operating systems such as Windows® and Linux with full software stacks. These stacks have interfaces that expose the implementations to hacking, malware, and other intrusions.

BRIEF SUMMARY OF THE INVENTION

The invention encompasses an embedded electronic payment system and an integrated circuit implementing, employing, and enabling an embedded electronic payment system merchant account.

An object of the invention is to provide two solutions for simplifying development of payment processes with particular acquirers. A first solution is to provide a standard transaction protocol module that will implement a standard interface to various participating acquirers. A second solution is to provide a programmable transaction module that can be programmed via a programming interface and an application programming interface (API) to implement a desired specific protocol.

The data that is to be processed is received from a payment instrument. Payment instruments is a term meant to include data sources that deliver account information for a transaction. Examples of payment instruments include credit cards, other payment cards, fobs, mobile wallets, and the like.

A further object of the invention is to reduce development time for adding payment processing to any device. By providing the EEP chip, engineers can add the EEP chip to the device hardware configuration along with interfaces to card readers, security programming, and networks, thereby embedding merchant account payment transaction ability into the device.

A further object of the invention is to encourage inclusion of the electronic payments capability in more appliances by lowering the inclusion cost for payment processing. As discussed, the availability of the EEP chip will reduce the cost to appliance developers. Reduced costs will allow for inclusion in devices with tight pricing margins where large marginal costs of otherwise including payment processing would be prohibitive.

By providing an EEP chip, appliance (i.e., devices generally) manufacturers can add electronic payment acceptance to any appliance with a printed circuit board and standard chip implementation design. Furthermore, because the EEP chip is prequalified by the electronic payment transaction acquirer, the appliance manufacture does not need to have the particular appliance approved by the acquirer. In addition, the EEP chip provides the additional security of using a hardware stack for its encryption and decryption.

For example, a vending machine can be adopted to take credit card payments by incorporating the EEP chip on a circuit board in the vending machine, essentially making the vending machine a merchant. An interface for reading credit card data can be added to the outside of the vending machine and connected to the circuit board to feed transaction data. The vending machine is then connected via a suitable network to the electronic payment transaction acquirer. The EEP chip creates encrypted approval request data to be sent to the acquirer. When the acquirer approves the transaction, the acquirer sends encrypted acquirer transaction data to the EEP chip. The EEP chip decrypts the encrypted acquirer transaction data and approves the transaction. The EEP chip instructs the vending machine to dispense the goods. In this way, a customer can use his credit card to buy the goods. More importantly, the vending machine manufacturer can add the electronic payment functionality with built-in approval by the acquirer, by virtue of using the EEP chip.

A further object of the invention is to simplify the acquirer certification process. Implementing the payment engine in a chip makes the certification process simple. The certification can be provided to the chip. Then, developers of appliances that utilize the certified chip will not need to certify their end appliances; the chip carries the certification.

A further object of the invention is to provide a flexible payment acceptance system. Flexibility is addressed in two ways: either with an industry standard acquiring interface protocol or a programmable one. In a standard acquiring interface protocol, the standard can be designed with built-in flexibility, such as register setting for various values. In the programmable side, the protocol can be fully programmable even as a proprietary protocol. This programmability can also be accomplished in a virtual machine running on an embedded microcontroller.

A further object of the invention is to increase the types of devices that can accept electronic payment. Existing devices can be modified to include the EEP chip in the device so that the device can take payments. Therefore, many different devices can have electronic payment capability built in. Existing devices can be upgraded or re-commissioned to include the EEP chip.

A further object of the invention is to increase the security in devices that accept electronic payments. Embedding the payment layers in an integrated circuit (i.e., chip) is a much more secure implementation than software implementations. The stack in a chip implementation is virtually inaccessible.

A further object of the invention is to reduce to practice the interfaces and protocols required for conducting electronic payments with an acquirer of electronic transactions, to an integrated circuit (IC), for use in embedded applications. This IC, or chip, can be implemented in the circuitry of devices/appliances to allow that device to "take" an electronic payment from a user. For example, a home appliance manufacturer like GENERAL ELECTRIC® could add the EEP chip to the circuitry of its laundry appliances to enable the laundry appliances to accept electronic payment, e.g., credit card payment, with a built-in not a separate) device. Another example would be point of sale kiosks where the devices could include EEP Chips embedded in their circuitry for taking electronic payments. Even an automobile could be a merchant and take payments services, songs, maps, fares, etc.

The solution also can be implemented as a design module available to be added to the design of another chip, much like an ALU or memory is a library module that a chip designer can add to an Application Specific Integrated Chip (ASIC). The EEP Chip also can be included in the design of computer-based systems or adapter cards or the like for easy implementation of a merchant account for taking electronic payments.

Today, typically, there are a number of layers of software required for securing, registering, and conducting payment transactions. The process for creating an implementation to allow a merchant's device to transact is very cumbersome, time consuming, and requires many man hours. Processor certification and security validation of each software implementation is tedious and costly. The transaction path is also subject to potential intrusion as it is made up of some open/common interfaces/buses etc., this poses significant security risk and liability that has proven to be costly.

An integrated circuit is provided to process payment instrument and transaction data into approval-request data that is evaluated by a payment transaction acquirer, a processor, or a payment instrument issuer. The integrated circuit includes a plate of semiconductor material and a set of electronic circuits on the plate of semiconductor material that define a hardware stack of memory and a logic unit for implementing a merchant account protocol needed to interact with the payment transaction acquirer, the payment processor, or the payment instrument issuer. The integrated circuit includes an input that receives the payment instrument data, the input being connected to the logic unit and the memory. The integrated circuit includes an output that sends approval-request data to the electronic payment transaction acquirer, the payment processor, or the payment instrument issuer. The output is connected to the logic unit and the memory.

According to one example, the integrated circuit may include a set of circuits that define a security element having an encrypted public key stored in the memory. The memory stores a private key sent by the electronic payment transaction acquirer, the payment processor, or the payment instrument issuer. According to one example, the private key decrypts the encrypted public key into a decrypted public key. The integrated circuit includes a first logic unit that decrypts the encrypted public key with the private key to produce the decrypted public key. The memory stores the decrypted public key and an encrypted entitlement message from the payment acquirer. The integrated circuit includes a second logic unit that decrypts the encrypted entitlement message with the decrypted public key to produce a decrypted entitlement message. The memory stores the decrypted entitlement message, the payment instrument, and the transaction data. The integrated circuit includes a third logic unit that encrypts the payment instrument data with the decrypted entitlement message to create encrypted approval-request data. According to one example, the memory stores the encrypted approval-request data. The integrated circuit includes an input that receives the payment instrument and transaction data. According to one example, the input is connected to the logic units and the memory. The integrated circuit includes an output for sending the encrypted approval-request data to an electronic payment transaction acquirer, a processor, or a payment instrument issuer. According to one example, the output is connected to the logic units and the memory. According to one example, the input receives encrypted acquirer transaction data from the electronic payment transaction acquirer, the processor, or the payment instrument issuer. According to one example, the memory of the security element stores a fourth logic unit for decrypting the encrypted acquirer transaction data into customer transaction data by using the decrypted public key.

An appliance is provided for processing electronic payments that includes a printed circuit board with an interface that connects to the integrated circuit described herein. The appliance includes an interface having an output that is connected to the input of the integrated circuit. The output transmits the payment instrument data to the integrated circuit and the interface further includes an input that is connected to the output of the integrated circuit. The input is further configured to transmit the encrypted approval-request data to the electronic payment transaction acquirer, the payment processor, or the payment instrument issuer.

A method is provided for processing payment instrument and transaction data into approval-request data that is evaluated by a payment transaction acquirer, a processor, or a payment instrument issuer through the integrated circuit described herein. According to one example, the payment instrument and transaction data is received at the input and processed into approval request data by the logic unit. An output is provided to output the approval request data.

A method is provided for processing payment instrument and transaction data into approval-request data that is evaluated by a payment transaction acquirer, a processor, or a payment instrument issuer by the integrated circuit described herein. The integrated circuit receives the private key, decrypts the encrypted public key using the first logic unit, and receives the encrypted entitlement message. The integrated circuit decrypts the encrypted entitlement message with the second logic unit, receives the payment instrument data, and encrypts the payment instrument data with the third logic unit. The integrated circuit transmits the encrypted approval request data to the payment acquirer.

A method is provided for making an integrated circuit that processes payment instrument and transaction data into approval-request data for evaluation by a payment transaction acquirer, a processor, or a payment instrument issuer. The method includes writing a first hardware description program for decrypting a public key with a private key that complies with VHDL. The method further includes configuring a programmable logic controller to create the first logic unit based on the first hardware description program and writing a second hardware description program for decrypting an encrypted entitlement message with a decrypted public key that complies with VHDL. The method includes configuring the programmable logic controller to create the second logic unit based on the second hardware description program and writing a third hardware description program for encrypting payment instrument data with a decrypted entitlement message that complies with VHDL. The method further includes configuring a programmable logic controller to create the third logic unit based on the third hardware description program and embedding an encrypted public key in the programmable logic controller.

In view of the objects, an apparatus adds embedded electronic payment taking to an appliance. The apparatus includes an integrated circuit with inputs and outputs. The number of physical inputs and outputs can be reduced by utilizing multipurpose input/output ports. The integrated circuit has a first input configured to receive data from a payment instrument, such as credit-card data. A first output is configured to transmit approval-request data to an electronic payment transaction acquirer. A second input is configured to receive acquirer transaction data from the acquirer. A second output configured to transmit customer transaction data. The integrated circuit is programmed to process the payment data received at the first input into approval-request data for processing by the transaction acquirer and to transmit the approval-request data from the first output. The integrated circuit is further programmed to process the transaction data received at the second input into the customer transaction data and to transmit the customer transaction data from the second output.

The integrated circuit can be programmed or designed to process credit-card data into approval-request data for processing by a transaction acquirer. The phrase "programmed or designed" is to include dynamic and static implementations of an integrated circuit.

A further object of the invention is to provide a system with an EEP Chip. The system would enable any EEP-enabled device/appliance to be a standalone access point for taking electronic payments. Examples of potential devices and appliances are cell phones and other wireless devices. This eliminates the requirement for the more typical "heavy" connectivity to a network device or gateway for secondarily conducting the transaction with the acquirer. As shown in FIG. 2, another example is an EEP-enabled map kiosk 400 in the middle of a mountain trail for the purchase of selling hiking maps. The kiosk 400 with EEP is essentially a merchant, with a merchant account, much like any retail store. The kiosk 400 includes a printed circuit board (PCB) 403. A chip with an embedded electronic payment chip is connected to the PCB 403. A card reader 401 is connected to the PCB 403 to provide transaction data. A cellular data interface 404 is connected to the PCB 403 for transmitting approval-request data via a cellular antenna 405 across the world wide web 406 to the acquirer 407. If the transaction is approved by the acquirer 407, approval information is transmitted to the PCB 403, which then triggers the map dispenser 402 to dispense a map. A solar panel 408 is included to power the kiosk 400.

Other features of the invention are set forth in the appended claims.

Although the invention is illustrated and described herein as embodied in an embedded electronic payment system and an integrated chip for electronic payment processing, the invention is not limited to the details shown because various modifications and structural changes may be made without departing from the invention and the equivalents of the claims. However, the construction and method of operation of the invention together with additional objects and advantages thereof will be best understood from the following description of specific embodiments when read in connection with the accompanying drawings.

DETAILED DESCRIPTION OF THE INVENTION

Figure 1:
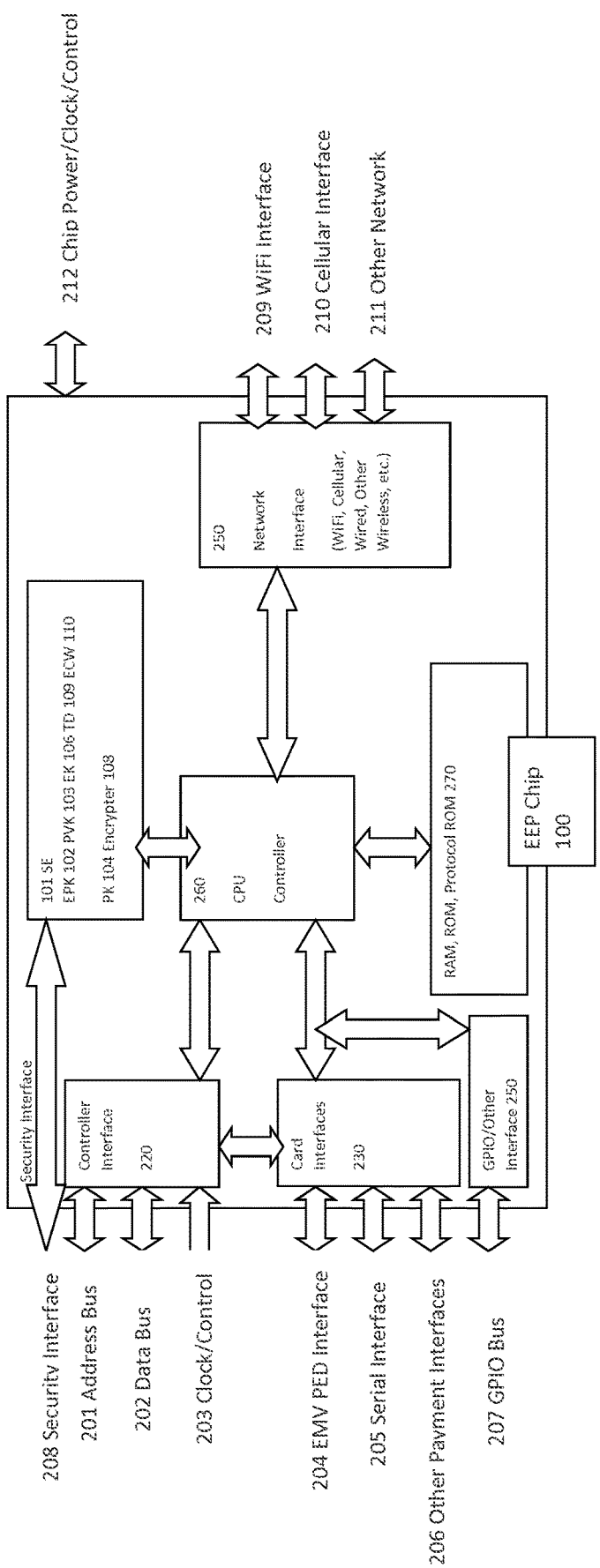
FIG. 1 is a schematic view of an embedded electronic payment system according to the invention.
Figure 2:
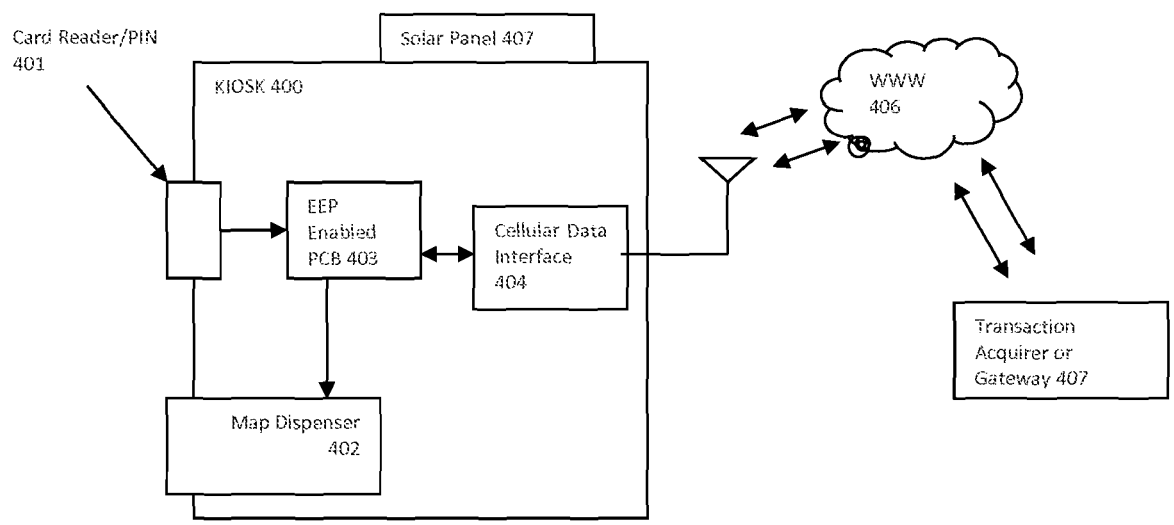
FIG. 2 is a schematic view of a solar powered map dispenser with an embedded electronic payment system according to the invention.

Embodiments of the invention are described below and are shown in the figures of the drawing.

There are at least four different embodiments of the invention.

First, the embedded electronic payment (EEP) module can be embodied as an integrated circuit (IC) or application specific integrated circuit (ASIC) for use on printed circuit boards (PCB) as part of a device or appliance. Examples of devices and appliances include a personal computer (PC), a washing machine, a vending machine, a television set-top box, a telephone, an entryway access control device, a jukebox, an automobile, a train, an arcade, etc.

Second, the EEP module can be embodied as a design element in a design element library for design into other integrated circuits, e.g., a microcontroller, so that the embedded payment function can be part of that chip.

Third, the EEP module can be embodied as a library element that can be "burned" into a programmable logic device such as those available from Altera or Xilinx, which allow for flexible design of PCBs as required by the over system engineer, as typical where programmable logic is used, even on demand.

Fourth, the EEP module can be embodied as a portable applet (i.e., a single purpose application), such as one to be run in a virtual machine such as JAVA® and the like. In such applets, the embedded electronic payment engine can be loaded into an on-demand run-time engine, e.g., Java Virtual Machine.

The embedded electronic payment functionality can be described using schematics, VHDL, a high level programming language, or any other generic or specific descriptive design-entry means that can be reduced (synthesized, compiled, or interpreted) into the form that is required for any of the above.

VHDL (VHSIC (very-high-speed integrated circuit) hardware description language) is a hardware description language used in electronic design automation to describe digital and mixed-signal systems such as field-programmable gate arrays and integrated circuits.

The above embodiments are different from the traditional "software stack" that is typical of payment applications that are compiled or interpreted software solutions that run from memory on a generic microprocessor-based system, such as a credit card terminal or point of sale (POS) computer.

Security Element

Figure 3:
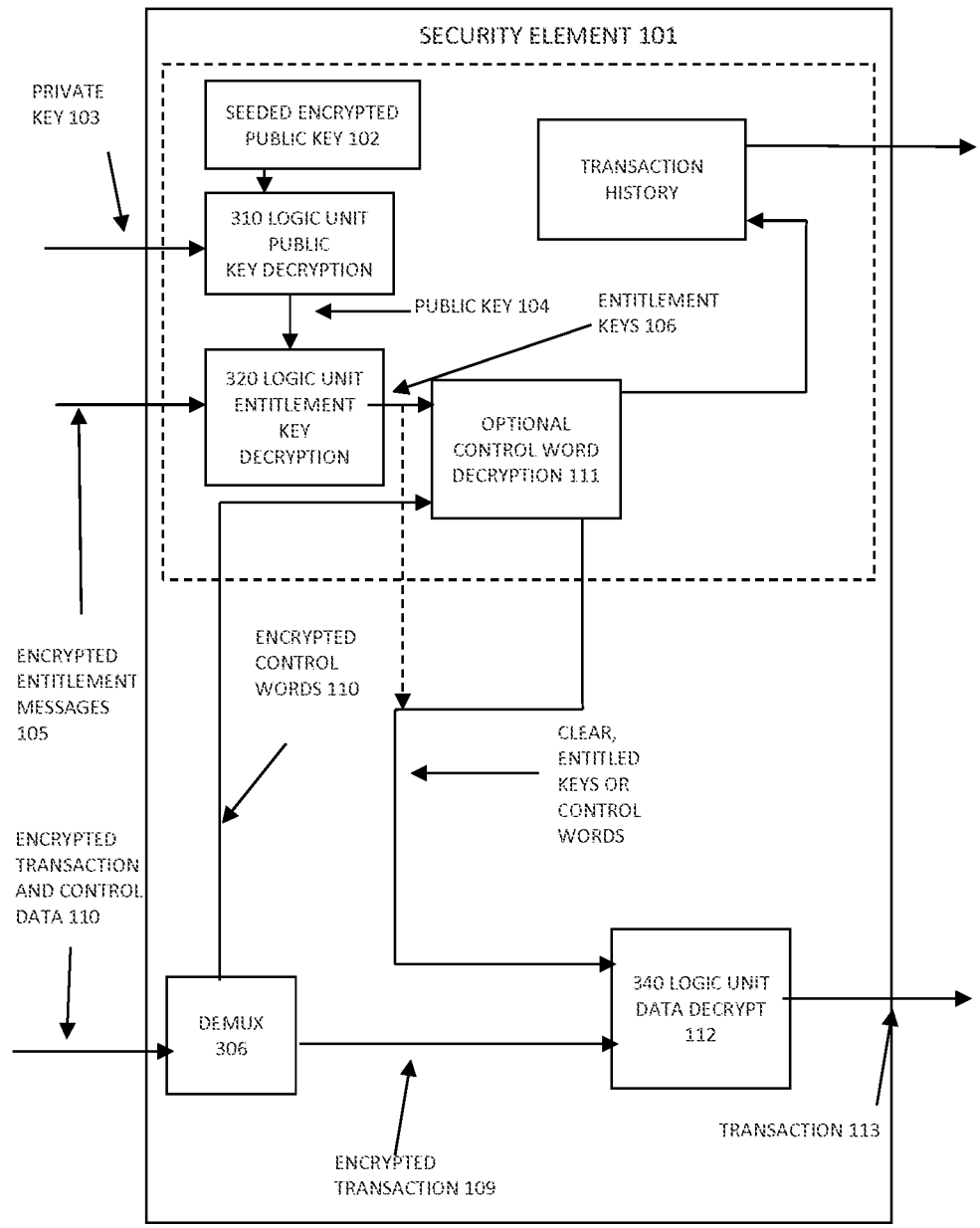
FIG. 3 is a schematic view of a security element according to the invention.

FIGS. 1 and 3 show a preferred embodiment of an embedded electronic payment (EEP) chip 100. The embedded electronic payment chip 100 is a plate of semiconductor material, preferably silicon, with a set of electronic circuits formed in the semiconductor material. The embedded electronic payment chip 100 includes a tamperproof security element 101.

An important component to the EEP chip 100 is the tamperproof Security Element (SE) 101 (SE), which also can be referred to as the security module. The SE 101 performs entitlement control and transaction data encryption and decryption.

Subject to possible standardization of details by payment industry consortia, the security element 101 provides for secure validation of a device's entitlement to transact and secure processing of transactions.

In a preferred embodiment, entitlement control is accomplished by seeding a unique encrypted public key (EPK) 102 into each device's SE 101 at the time of manufacture of the EEP chip 100 itself. In an alternate embodiment, the encrypted public key 102 is programmed into the SE 101 at the time of assembly into an appliance via a secure interface 208. The secure interface 208 is preferably a one-time write interface.

Depending on desired entitlement control, an electronic payment transaction acquirer provides a private key (PVK) 103 to the EEP chip 100. The private key 103 is stored in the security element 101. The private key 103 can decrypt the encrypted public key (EPK) to create a decrypted public key or more-simply a public key (PK). The private key 103 is generated with public key and is kept by the device manufacturer or acquirer. Entitlement messages (EM) determine which transactions the embedded electronic payment chip 100 is entitled to process on behalf of the electronic payment transaction acquirer. For example, the presence and/or absence of particular entitlement messages enable whether the EEP chip 100 will accept debit payments, credit-card payments, or other types of payments, or not. Encrypted entitlement messages (EEM) 105 contain decrypted entitlement keys or more simply Entitlement Keys (EK) 106 and are decrypted in the security element 101 using the decrypted public key 104. A computer program for decrypting entitlement keys (i.e., a decrypter) 107 with the public key 104 is stored in the security element 101. Encrypted Entitlement Messages can be provided by an entitlement server controlled by the electronic payment transaction acquirer at design time or at another time, for example, at a periodic upgrade or transaction time.

The embedded electronic payment chip 100 will encrypt Transaction Data (TD) 109 when authorized according to the entitlement keys (EKs) 106. Examples of typical transaction data include payment account identifiers, transaction amount, terminal identifiers, and the like. Transaction data can be entered, for example, from an attached device such as a credit-card reader, a computer, telephone, smartphone, appliance, or the like. Transaction data can further include approval information such as approvals, denials, and transaction limits.

Yet another layer of encryption is possible (if desired) where the Transaction Data is encrypted with Encrypted Control Words (ECW) 110 that are encrypted themselves by the Entitlement Keys (EK) 106. A computer program for encrypting (i.e., an encrypter) 108 the transaction data with the encrypted control words is stored in the security element 101. Control words are the beginning of the transaction encryption chain, as opposed to an entitlement encryption chain. Control words are used in the encryption of transaction data. Control words are encrypted in the ECW for use later to decrypt the encrypted transaction data.

The relationships between encrypted data and decrypted data are shown in the following functions and is further illustrated in FIG. 4. In the functions x represents a decrypt function, preferably, 3DES or AES, but could be another cryptography algorithm. In cryptography, 3DES, also known as Triple DES, is the common name for the Triple Data Encryption Algorithm (TDEA or Triple DEA) block cipher, which applies the Data Encryption Standard (DES) cipher algorithm three times to each data block. The Advanced Encryption Standard (AES) is a specification for the encryption of electronic data established by the U.S. National Institute of Standards and Technology (NIST) in 2001.

$$PK = EPK \times PVK$$

$$EK = EEM \times PK$$

$$CW = ECW \times EK$$

$$TD = ET \times CW$$

Figure 4:
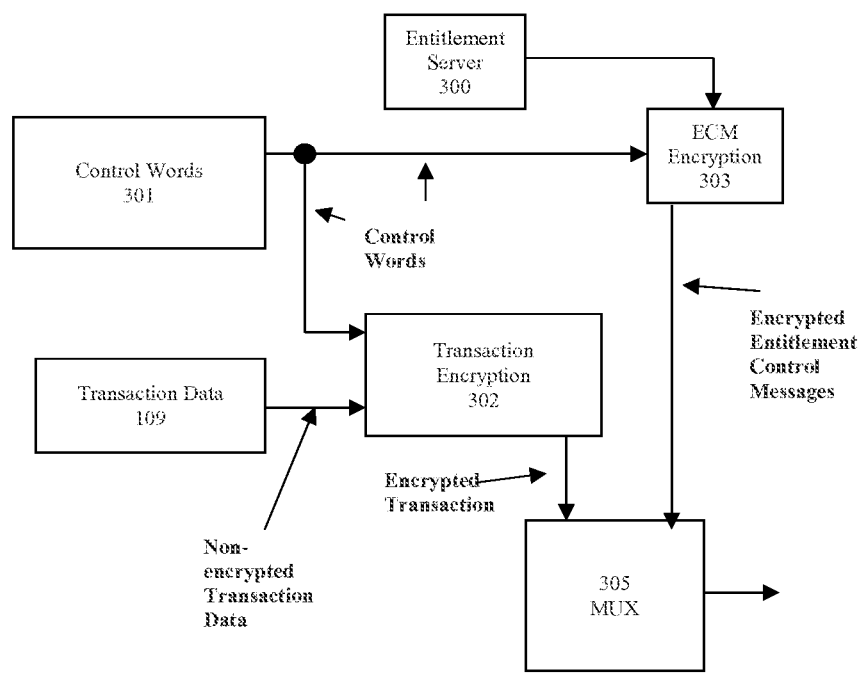
FIG. 4 is a schematic view showing the encryption and decryption of data in the security element.

FIG. 4 shows how data is being encyrpted and decrypted by the security element. An entitlement server 300 connected to the security element provides entitlement keys. Control words 301 are generated from the transaction data. Control words 301 are used for transaction encryption 302 of the transaction data. For added security, ECW encryption 303 can be added by encrypting the control words 301 using an entitlement key from an entitlement server 300 to create encrypted entitlement control messages 304. The encrypted transaction data and/or the encrypted entitlement control messages can be transmitted to a multiplexer 305, which in turn can be connected to a GPIO.

The SE can implement failsafe messages that can kill a rogue device by altering its entitlement.

The EEP chip 100 includes the following additional features. The additional features are exemplary and are not necessarily required in other embodiments. A controller interface 220 receives information regarding addressing of data and timing. The controller interface 220 is comprised of an address bus interface 201 for connecting to an address bus, a data bus interface 202 for connecting to a data bus, a clock/control interface 203 for connecting to a system clock and control signals. A card interface 230 provides interfaces for various payment instrument devices. The card interface 230 includes an EMV PED Interface 204. EMV stands for EMV stands for Europay, MasterCard and Visa, a global standard for inter-operation of integrated circuit cards (IC cards or "chip cards") and IC card capable point of sale (POS) terminals and automated teller machines (ATMs), for authenticating credit and debit card transactions. The card interfaces 230 include a serial interface 205. The card interface 230 may include other payment interfaces 206. The EEP chip 100 includes a chip power/clock/control 212. The EEP chip 100 has a network interface 240 for sending and/or receiving data from the electronic payment transaction acquirer. The network interface 240 includes a Wi-Fi interface 209, a cellular interface 210, and other network interface 211. The EEP chip 110 includes a General Purpose Input/Output (GPIO) 250, which is a generic pin on the chip 100 whose behavior (including whether it is an input or output pin) can be programmed. The EEP chip 100 includes a CPU/microcontroller 260. The EEP chip 100 includes memory 270, in particular, RAM, ROM, and protocol ROM.

Abbreviations

ECW=Encrypted Control Words
EEP=Embedded Electronic Payment
EEM=Encrypted Entitlement Messages
EK=Entitlement Keys
EM=Entitlement message
EPK=Encrypted Public Key
PK=Public Key
PVK=private key
SE=Security Element or Security Module
TD=Transaction Data

What is claimed is:

1. An appliance for processing electronic payments, the appliance comprising:
   a printed circuit board;
   a card reader electrically coupled to the printed circuit board;
   a cellular data interface electrically coupled to the printed circuit board;
   an integrated circuit that is electrically coupled to the printed circuit board, the card reader, and the cellular data interface, the integrated circuit being adapted to process payment instrument and transaction data into approval-request data that is evaluated for responses by a payment transaction acquirer, a payment processor, or a payment instrument issuer, the integrated circuit comprising:
   a first input that receives the payment instrument;
   a second input that receives the transaction data via the cellular interface;
   a controller that enables selection among a plurality of payment transaction acquirers, a plurality of payment processors, and a plurality of payment instrument issuers, the controller implementing merchant account protocols associated with the plurality of payment transaction acquirers, the plurality of payment processors, or the plurality of payment instrument issuers;
   an output that provides the approval-request data via the cellular interface to the selected payment transaction acquirer, payment processor, or payment instrument issuer, the approval-request data incorporating the payment instrument and transaction data; and
   a third input that receives a response to the approval-request data via the cellular interface from the selected payment transaction acquirer, payment processor, or payment instrument issuer.

2. The appliance according to claim 1, further comprising a security element that is electrically coupled to the integrated circuit, the security element including:
   an encrypted public key;
   a private key obtained from the selected payment transaction acquirer, payment processor, or payment instrument issuer via the cellular interface, the private key being used to decrypt the encrypted public key into a decrypted public key, wherein the security element decrypts the encrypted public key with the private key to produce the decrypted public key, wherein the security element receives an encrypted entitlement message from the selected payment transaction acquirer, wherein the security element decrypts entitlement keys obtained from the encrypted entitlement message with the decrypted public key, wherein the security element encrypts the payment instrument and transaction data with the corresponding decrypted entitlement key to create encrypted approval-request data, wherein the security element provides the encrypted approval-request data to the selected payment transaction acquirer, payment processor, or payment instrument issuer.

3. The appliance according to claim 2, wherein the second input receives encrypted acquirer transaction data from the selected payment transaction acquirer, payment processor, or payment instrument issuer and wherein the security element decrypts the encrypted acquirer transaction data into customer transaction data using the decrypted public key.

4. The appliance according to claim 1, wherein the integrated circuit enables the appliance to take an electronic payment.

5. The appliance according to claim 1, wherein the integrated circuit is incorporated on the printed circuit board.

6. The appliance according to claim 1, wherein the payment instrument and transaction data includes at least one of credit card data, payment card data, fob data, memory device data, smartcard data, and mobile wallet data.

7. The appliance according to claim 6, further comprising a reader that is electrically coupled to the integrated circuit, wherein the reader obtains the credit card data, the payment card data, the fob data, the memory device data, the smartcard data, and the mobile wallet data.

8. The appliance according to claim 1, wherein the appliance includes at least one of a vending machine and a kiosk.

9. The appliance according to claim 8, wherein the integrated circuit instructs the vending machine to dispense goods.

10. An appliance for processing electronic payments, the appliance comprising:

a printed circuit board;

a card reader electrically coupled to the printed circuit board; a cellular data interface electrically coupled to the printed circuit board;

an integrated circuit that is electrically coupled to the printed circuit board, the card reader, and the cellular data interface, the integrated circuit being adapted to process payment instrument and transaction data into approval-request data that is evaluated for responses by a payment transaction acquirer, a payment processor, or a payment instrument issuer, the integrated circuit comprising:

a first input that receives the payment instrument;

a second input that receives the transaction data via the cellular interface;

a controller that enables selection among a plurality of payment transaction acquirers, a plurality of payment processors, and a plurality of payment instrument issuers, the controller implementing merchant account protocols associated with the plurality of payment transaction acquirers, the plurality of payment processors, or the plurality of payment instrument issuers;

an output that provides the approval-request data via the cellular interface to the selected payment transaction acquirer, payment processor, or payment instrument issuer, the approval-request data incorporating the payment instrument and transaction data; and a third input that receives a response to the approval-request data via the cellular interface from the selected payment transaction acquirer, payment processor, or payment instrument issuer;

a security element that is electrically coupled to the integrated circuit, the security element including:

an encrypted public key;

a private key obtained from the selected payment transaction acquirer, payment processor, or payment instrument issuer, the private key being used to decrypt the encrypted public key into a decrypted public key, wherein the security element decrypts the encrypted public key with the private key to produce the decrypted public key, wherein the security element receives an encrypted entitlement message from the selected payment transaction acquirer, wherein the security element decrypts entitlement keys obtained from the encrypted entitlement message with the decrypted public, wherein the security element encrypts the payment instrument and transaction data with the corresponding decrypted entitlement key to create encrypted approval-request data, wherein the security element provides the encrypted approval-request data to the selected payment transaction acquirer, payment processor, or payment instrument issuer.

11. The appliance according to claim 10, wherein the integrated circuit enables the appliance to take an electronic payment.

12. The appliance according to claim 10, wherein the integrated circuit is incorporated on the printed circuit board.

13. The appliance according to claim 10, wherein the payment instrument and transaction data includes at least one of credit card data, payment card data, fob data, memory device data, smartcard data, and mobile wallet data.

14. The appliance according to claim 13, further comprising a reader that is electrically coupled to the integrated circuit, wherein the reader obtains the credit card data, the payment card data, the fob data, the memory device data, the smartcard data, and the mobile wallet data.

15. The appliance according to claim 10, wherein the appliance includes at least one of a vending machine and a kiosk.

16. The appliance according to claim 15, wherein the integrated circuit instructs the vending machine to dispense goods.

17. A method for processing payment instrument and transaction data into approval-request data at an appliance, the payment instrument and transaction data being evaluated for responses by a payment transaction acquirer, a payment processor, or a payment instrument issuer, the method comprising:

enabling, via an integrated circuit, selection among a plurality of payment transaction acquirers, a plurality of payment processors, and a plurality of payment instrument issuers;

implementing merchant account protocols associated with the plurality of payment transaction acquirers, the plurality of payment processors, or the plurality of payment instrument issuers;

receiving a private key via the cellular interface;

decrypting an encrypted public key;

receiving an encrypted entitlement message via the cellular interface;

decrypting entitlement keys obtained from said encrypted entitlement message;

receiving the payment instrument and transaction data;

encrypting the payment instrument and transaction data with said corresponding decrypted entitlement key to create encrypted approval-request data;

transmitting said encrypted approval-request data via the cellular interface to the selected payment transaction acquirer, payment processor, or payment instrument issuer; and receiving a response to the encrypted approval-request data via the cellular interface from the selected payment transaction acquirer, payment processor, or payment instrument issuer.

18. The method according to claim 17, wherein the payment instrument and transaction data includes at least one of credit card data, payment card data, fob data, memory device data, smartcard data, and mobile wallet data.

19. The method according to claim 17, wherein the appliance includes at least one of a vending machine and a kiosk.

20. The method according to claim 19, further comprising dispensing goods at the vending machine in response to the encrypted approval-request data.

* * * * *